United States Patent Office 3,546,916
Patented Dec. 15, 1970

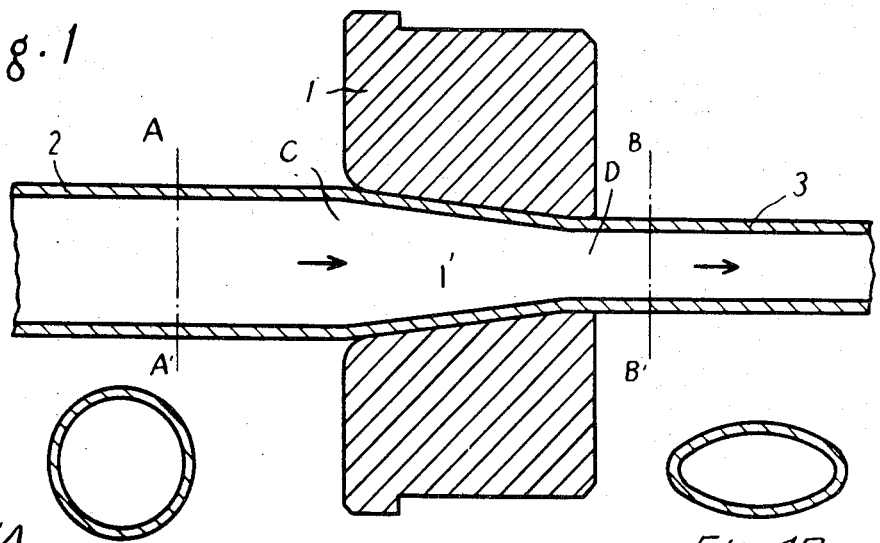
Fig. 1
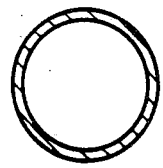
Fig. 1A
Fig. 1B
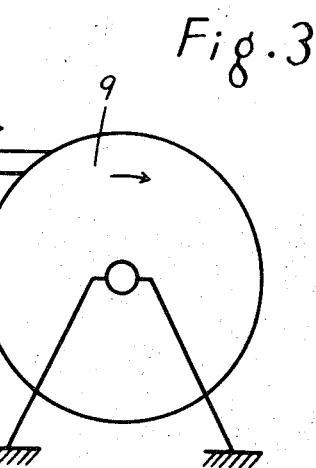
Fig. 3
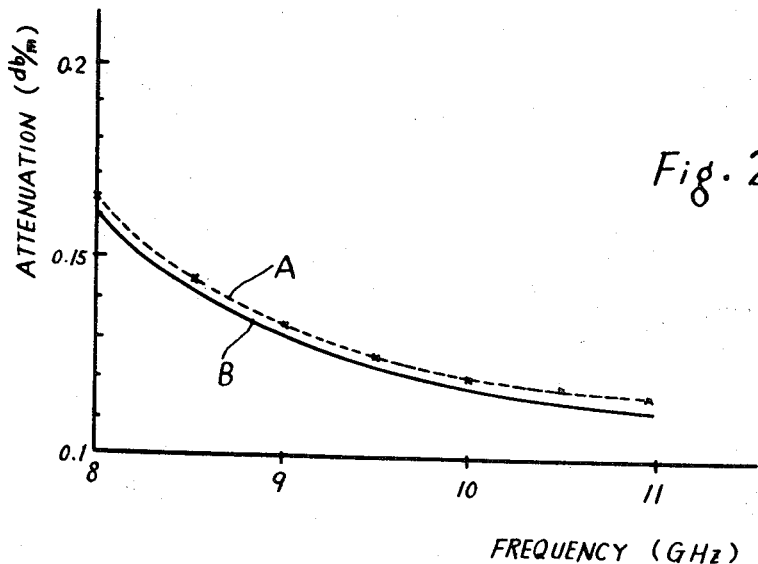
Fig. 2

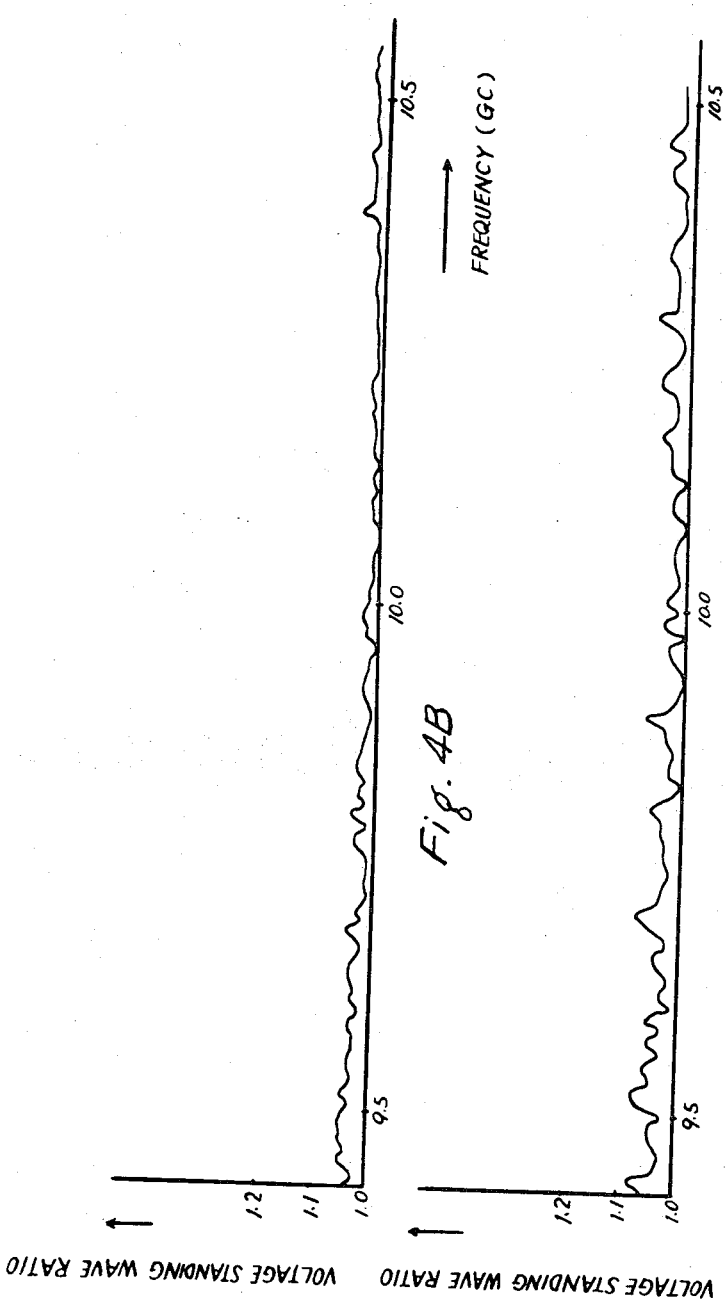

3,546,916
ELLIPTIC WAVE-GUIDE AND METHOD OF FABRICATING IT
Tsutomu Maeda and Sunao Morisada, Nishinomiya-shi, Tatsuji Kasajima, Toyonaka-shi, and Takeshi Hashida, Kobe-shi, Japan, assignors to Dainichinihon Densen Kabushiki Kaisha, Hyogo-ken, Japan, a company of Japan
Filed Oct. 11, 1967, Ser. No. 674,520
Int. Cl. B21c 23/00
U.S. Cl. 72—256    8 Claims

ABSTRACT OF THE DISCLOSURE

An improved elliptical waveguide and method of fabricating it in continuous lengths.

---

This invention relates to an improved elliptical waveguide and to an improved method of continuously fabricating the waveguide so that it can be provided in any desired length and at the same time afford excellent transmission characteristics.

Waveguides used in microwave transmission have been formed by connecting a series of rigid waveguides of relatively short and precise geometry. Such waveguides are relatively expensive and troubles are frequently encountered because of the relatively large number of joints. It is recognized that losses at the joints are caused by loosening of the joint portions, insufficient contact, and joint corrosion. Sectional waveguides also increase the voltage standing wave ratio. Such prior waveguides are also disadvantageous because the guides are rigid and cannot be bent or formed to facilitate installation but rather require separate curved portions to conform to the requirements of the equipment in which it is to be utilized. Furthermore, equipment designs must generally be limited to standardized sizes of waveguides and corner or curved portions. In addition, the utilization of preformed short lengths of waveguides materially increases the time and effort required for installation and extreme care is required in the manufacture, packaging and transportation of waveguide portions in order to avoid damage to both the waveguides as well as the end flanges which are required for interconnecting waveguide sections.

Typical sectional shapes of conventional waveguides are rectangular and circular. In the case of rectangular waveguides, substantial deformation may be produced should the waveguide be bent and this deformation adversely affects its transmission characteristics. In the case of a circular waveguide, slight deformation may result in modification of the transmission mode or rotation of the plane of polarization. Inasmuch as substantial transmission loss may be encountered by any bending or deformation, rigid structures are required in an effort to minimize such losses. In the fabrication of rectangular or circular waveguides, it is, therefore, necessary to have a precise and accurate geometry in order to maintain a stable and uniform transmission characteristic. For this purpose such waveguides have been fabricated by electroforming, cladding or drawing, the latter utilizing either a plug or mandrel. These prior methods of fabrication are only applicable to waveguides of relatively short lengths because of the limitation of the lengths of the tools, namely, molds, jigs, mandrels, and the like.

It has been found that waveguides of elliptical cross-section in accordance with the invention encounter less deformation upon bending and furthermore cause much smaller trasmission loss even though some deformation does occur. Since such waveguides can be bent with less deformation they can be made in continuous lengths and wound on a reel. It, therefore, is possible to form such waveguides in substantially long lengths and thus avoid losses in joints occasioned by rectangular and circular waveguides, and losses resulting from the increase of the voltage standing wave ratio as previously discussed. Heretofore, elliptical waveguides have been formed in substantially the same manner as circular and rectangular waveguides, as for instance electroforming, cladding, or drawing using a plug or mandrel and the like. Such methods, however, limit the maximum length of the waveguide and thus the same disadvantages of rectangular and circular guides are encountered. It has been suggested that waveguides be formed by shaping a strip of copper into a cylinder and then welding the butting edges. The cylinder was then corrugated and the corrugated cylinder was shaped into a corrugated hollow elliptical tube by shaping rollers to form an elongated elliptical waveguide. With such a method, however, it is difficult to produce a smooth uniform weld. Furthermore, the seam line would not have the same mechanical strength as the other portions and the welded portion would also be of non-uniform thickness. As a result, irregularities would occur when such an elliptical waveguide was shaped by the shaping rollers, which irregularities materially affected the transmission characteristics such as the voltage standing wave ratio. While a welded elliptical waveguide can be corrugated, the loss of mechanical strength at the welded portion makes it extremely difficult to provide a uniform corrugation, and this again adversely affects the transmission characteristics.

This invention provides a novel and improved ellipical waveguide and method of manufacturing such a waveguide in continuous lengths which overcomes the disadvantages heretofore encountered in the fabrication of such guides. Accordingly, it is one object of the invention to provide a novel and improved waveguide which can be made in exceedingly long lengths without the need for intervening joints.

Another object of the invention resides in the provision of a novel and improved waveguide which can be formed and wound on a reel to facilitate handling, transportation and installation.

Still another object of the invention resides in the provision of an improved method for fabricating elliptical waveguides in substantially continuous lengths.

A still further object of the invention resides in a novel and improved method for fabricating elliptical waveguides in a continuous process including the steps of extruding metal and then drawing it to form a waveguide of the desired configuration.

A still further object of the invention resides in an improved method of fabricating an elliptical waveguide which fabrication may be carried out at the place of installation.

Still another object of the invention resides in a novel and improved method of forming waveguides which can be shaped to remove deformations just prior to installation.

A still further object of the invention resides in the provision of a novel and improved waveguide and method of fabrication.

A still further object of the invention resides in the provision of improved corrugated flexible waveguides of relatively long lengths.

The above and other objects of the invention will become more apparent from the following description and accompanying drawings forming part of this application.

In the drawings:

FIG. 1 is a cross-sectional view of one step in the formation of an elliptical waveguide in accordance with the invention.

FIGS. 1A and 1B, are cross-sections of the elliptical waveguide of FIG. 1 taken at sections A–A' and B–B' respectively.

FIG. 2 is a graph illustrating the frequency attenuation characteristics of an elliptical waveguide in accordance with the invention.

FIG. 3 is a diagrammatic view of another embodiment of a process for fabricating an elliptical waveguide in accordance with the invention.

Figure 5:
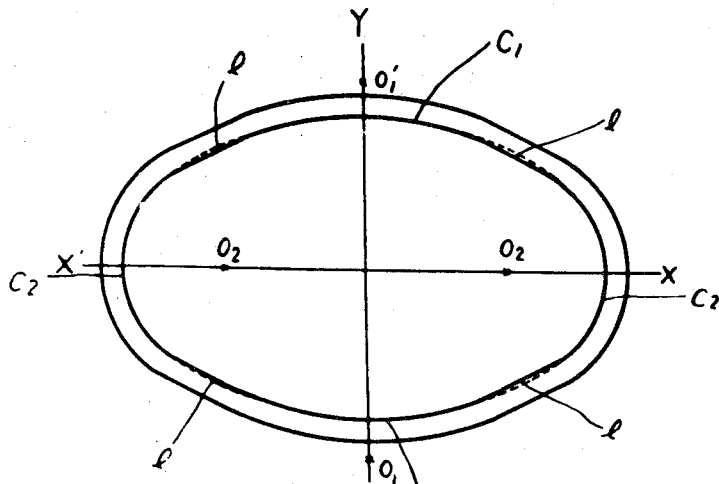

FIGS. 4A and B are graphs illustrating changes in the voltage standing wave ratio effected by shaping of a preformed elliptical waveguide just prior to installation in accordance with the invention, FIG. 5 is a cross-sectional view of an elliptical waveguide in accordance with the invention wherein two pairs of circular arcs are interconnected by linear portions.

Figure 6:
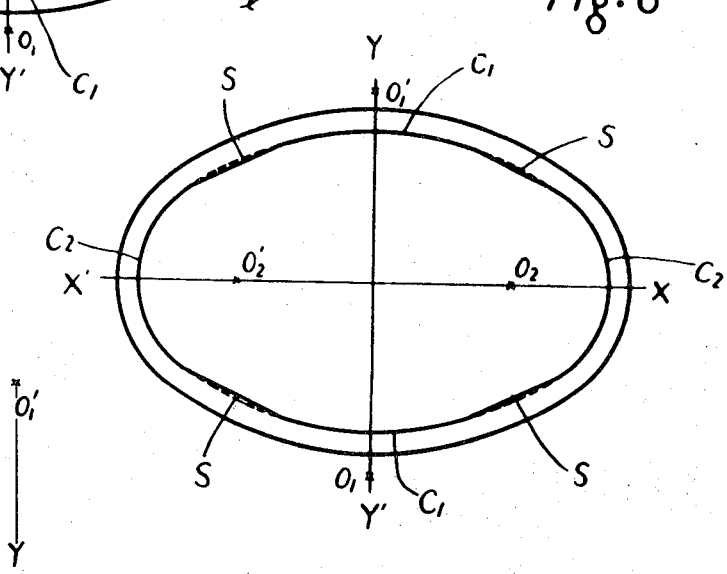

FIG. 6 is a cross-sectional view of an elliptical waveguide in accordance with the invention wherein two sets of circular arcs are joined by curved portions.

Figure 7:
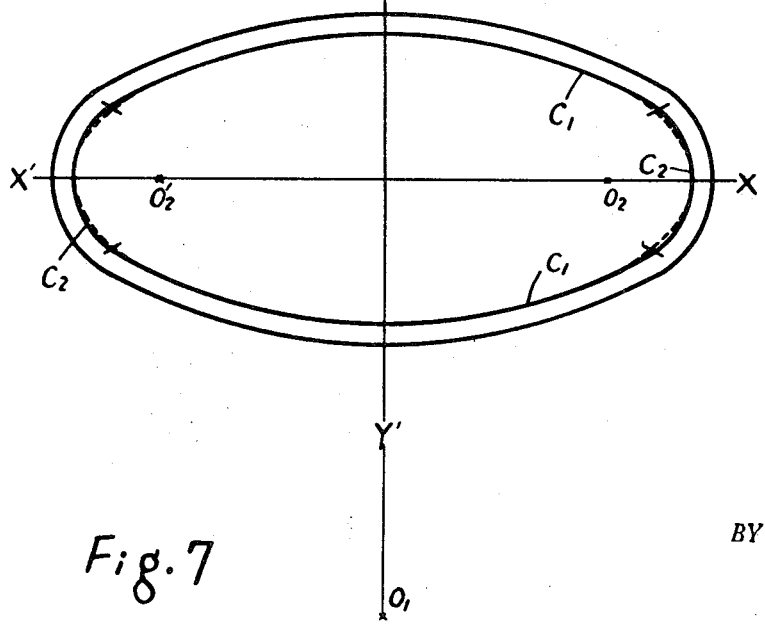

FIG. 7 is a cross-sectional view of an elliptical waveguide in accordance with the invention wherein the two sets of circular arcs are directly joined one to the other.

Referring now to FIG. 1, an extruded aluminum pipe 2 having a circular cross-section A–A' having a smooth inner face is drawn through a die 1 of chromium steel or the like. The die 1 has a hole 1' wherein the inlet portion C is of circular configuration while the outlet D is of elliptical shape. The inner surface of the hole 1' is shaped so that it gradually changes from a circular cross-section to an elliptical cross-section and the tube or pipe 2 is drawn through the die by a caterpillar pulling device not shown. The shaped elliptical waveguide 3 emerging from the outlet portion of the die is represented by the letters B–B'. The metal pipe or tube 2 may have a circular or slightly elongated circular cross-section and an inner circumferential length which is equal to or slightly greater to the inner circumferential length of the formed elliptical waveguide 3. In forming the elliptical waveguide 3 through use of the die 1, it is preferable that a suitable lubricant such as cylinder oil be applied to the hole 1' in order to insure the attainment of a smooth and uniform elliptical waveguide 3.

Conventional practice in the manufacture of pipe having an accurate or precise inner dimension usually requires a floating plug which is retained in position in the pipe as it is drawn. In the performance of the method in accordance with the invention, the pipe or tube which is to be formed into an elliptical cross-section is preferably extruded so that it is of uniform thickness, homogenous, has a smooth inner face and an accurate inner circumferential length. Furthermore, the pipe or tube may either have a circular section or an elongated circular section either of which may be formed easily and accurately to form an elliptical waveguide. Furthermore, while aluminum has been found to be a most advantageous material for this purpose, other conductive materials may be employed.

Further in connection with FIG. 1, if the inner circumferential length of the metal pipe 2 is equal to that of the elliptical waveguide 3, shaping can be easily effected by the die 1. If the inner circumferential length of the metal pipe 2 is slightly longer than that of the elliptical waveguide 3, reduction shaping is automatically accomplished by the die 1. It has been found that the inner circumferential length of the pipe 2 can be reduced by the shaping operation by as much as 20 percent. It is also apparent, of course, that the die 1 may either be fixedly positioned and the tube 2 forced through the die or in the alternative the pipe may be supported and the die 1 may be moved relative to the pipe.

One example of an elliptical waveguide fabricated by the aforementioned method involves the utilization of an aluminum pipe having a thickness of about 2 mm. and an inner diameter of 20 mm. The pipe is then forced through a die such as the die 1 to produce a resultant elliptical waveguide of approximate elliptical cross-section having a major axis of 27.4 mm. and a minor axis of 12.2 mm. Such a waveguide is usable for the 10 gHz. band with the $eH_1$ mode being used as the fundamental mode.

Referring now to FIG. 2, curve A indicates measured values of the elliptical waveguide in accordance with the invention while curve B represents calculated values of an ideal elliptical waveguide of the same general size. It will be observed that the actual waveguide represented by the curve A encounters a 3 percent loss over the calculated values. This loss appears to result from the fact that the ellipse is not a precise ellipse which of course results from the errors in geometry of the forming die. With prior rectangular and circular waveguides, a much greater loss occurs by reason of the many joints whereas with the long elliptical waveguide in accordance with the invention the elimination of the joint portions results in materially improved transmission characteristics.

FIG. 3 represents another embodiment of the invention for fabricating elliptical waveguides. In this form of the invention, the aluminum pipe denoted by the numeral 5 is extruded by the press 4 and is immediately drawn through the shaping die 6 which corresponds to the die 1 of FIG. 1. The pulling device 8 pulls the tube 5 through the die 6 to form an elliptical waveguide 7 which may then be wound on the reel 9. Thus the elliptical waveguide is fabricated in an essentially continuous operation.

The methods in accordance with the invention as shown in FIGS. 1 and 3 are particularly useful in the formation of an improved elliptical waveguide, and slight deformations will not have a material effect on its characteristics. In the case of a circular waveguide, a slight elliptic deformation will cause the transmission mode to be converted into two modes whereupon the plane of polarization can be easily rotated. Therefore, the geometry must be precise with respect to the transmission characteristics. Such precision, however, cannot be attained by shaping procedures. It is also difficult to fabricate a rectangular waveguide of sufficiently accurate geometry by a shaping method. Distortion and deformation occur easily and thus it is difficult to obtain a satisfactory transmission characteristic. Even if a rectangular waveguide having a satisfactory transmission characteristic could be fabricated, it could not be wound on a reel as the structure is easily deformed.

The invention affords still a further advantage in that it enables reshaping of the waveguide after it has been removed from the reel used to facilitate transportation. Unwinding the waveguide may cause some deformation which would normally result in an increased loss and a deterioration of the voltage standing wave ratio. This would occur particularly if some bending or improper handling took place during fabrication. Some deformation may have also occurred causing a partial variation in cross-section as a result of the winding and unwinding. This invention affords means to avoid such deformations as illustrated by the following examples.

By reason of the improved methods of manufacturing elliptical waveguides in accordance with the invention, a circular aluminum tube having a wall thickness of 2 mm. and an internal diameter of 22 mm. can be wound on a reel and carried to the place of installation of the waveguide. A shaping die as previously described and a suitable pulling device can be provided at the place of installation to shape the aluminum pipe just prior to installation. Slight deformation of the circular tube prior to shaping into an elliptical cross-section will not affect the resultant waveguide and with a pipe of the dimensions as set forth, an elliptical waveguide can be produced having a thickness of approximately 2 mm., a major inner diameter of 27.4 mm. and a minor inner diameter of 12.2 mm.

In so doing, the transmission characteristics as illustrated in FIG. 2 are clearly obtainable. If, on the other hand, the elliptical waveguide is formed and then wound on a reel, it can be reshaped by a suitable shaping die and pulling device upon removal from the reel. The voltage standing wave ratio characteristics before and after reshaping are represented in FIG. 4 in which the curve A represents the characteristic before reshaping and the curve B the characteristic after reshaping. Thus reshaping of the waveguide substantially corrects all deformation that may have been caused by winding the waveguide on a reel. The invention as described above, therefore, involves forming of an elliptical waveguide and then, if desired, reshaping it at the place of installation or in the alternative shipping the circular tubing to the place of installation and then shaping it just prior to installation. It is also to be understood that the shaping die may function to reduce the inner circumferential length of the circular tubing as much as 20 percent in the formation of the resultant elliptical waveguide.

As described above, this invention facilitates the manufacture and installation of elliptical waveguides having satisfactory characteristics and, accordingly, a substantial industrial utility. Elliptical waveguides having an approximate elliptical cross-section have been found to be most effective and may be shaped merely with a shaping die and without the use of plugs, mandrels, or methods of drawing using plugs or mandrels. In drawing methods utilizing plugs or mandrels, it is difficult to shape and finish them to a specific size with the result that the cost of fabrication is quite expensive. With the present invention, elliptical waveguides, unlike circular and rectangular waveguides, are not affected materially in the fundamental transmission characteristics by minor deviations or slight changes in size. Accordingly, this invention permits the manufacture of waveguides of approximate elliptical section which are easily manufactured and have a transmission characteristic closely approaching that of the perfect elliptical waveguide. The elliptical waveguides in accordance with the invention are shown in FIGS. 5, 6 and 7, all of which have a pair of mutually facing circular arcs $C_1$—$C_1$ with their centers on the minor axis Y-Y' and a second pair of mutually facing arcs $C_2$—$C_2$ having shorter radii and with the centers on the major axis X'—X'.

FIG. 5 is a cross-sectional view of an elliptical waveguide in accordance with the invention and as described above. It will be observed that the two sets of arcs $C_1$—$C_1$ and $C_2$—$C_2$ are connected by straight lines $l$; thus the structure is not a true ellipse. FIG. 6 is a cross-sectional view of a waveguide along the lines of FIG. 5 except that the two sets of circular arcs $C_1$—$C_1$ and $C_2$—$C_2$ are connected by curved portions S. FIG. 7 is a cross-sectional view of still another embodiment of the invention, but in this instance the ratio of the major to the minor axis is somewhat greater than that shown in FIGS. 5 and 6. In this case, the arcuate sections $C_1$—$C_1$ and $C_2$—$C_2$ are directly connected and the ellipse more closely approximates a perfect ellipse. The dotted line portions of FIGS. 5 and 7 have been shown to indicate the confromation of the structure were it a perfect ellipse.

The characteristics of the elliptical waveguides using an approximate ellipse as shown in FIG. 5 is represented in FIG. 2 of the drawings wherein curve A is the actual efficiency while curve B is the calculated or theoretical efficiency. The structures of FIGS. 6 and 7 substantially coincide with the results shown in FIG. 2 as evidenced from actual tests and study. Accordingly, the variation in losses between a waveguide of approximate elliptical cross-section and one of perfect elliptical cross-section is within 3 percent and the simplicity of fabrication of the improved waveguide in accordance with the invention more than overcomes the slight loss of transmission characteristics.

The above described elliptical waveguides have been formed by shaping aluminum pipes or tubes having smooth inner and outer surfaces into an elliptical shape. When smooth elliptical waveguides are used at the lower frequencies, for example, in the 5 gHz. band, the waveguide must be made larger; for such a case, the inner major diameter would be 45.9 mm. and the inner minor diameter would be 27.9 mm. With the increased size of the waveguide some reduction in flexibility is encountered and it is necessary to limit the radius of curvature when winding the waveguides on a reel for transportation. In such cases, it is advantageous to use corrugated elliptical waveguides in place of smooth elliptical waveguides to improve flexibility. The methods and shapes of approximate ellipses in accordance with this invention are also applicable to corrugated elliptical waveguides.

With prior methods of forming elongated waveguides such as the method wherein a copper strip is shaped into a cylinder has not been found satisfactory. As previously discussed, the forming of a copper strip into a cylinder, welding the abutting edges to form a hollow cylinder, and then corrugating the cylinder prior to shaping presents numerous problems. For instance, it is difficult to obtain a smooth and uniform corrugation and an elliptical shape because of the variations in thickness of the welded portion, formation of burrs and projections. With this invention, however, elliptical waveguides can be formed utilizing corrugated extruded metal pipe or tubing and specifically aluminum pipe and shaping it into an elliptical configuration. The shaping can be accomplished by the use of a die and does not encounter the problems entailed by reason of the fluctuation of the thickness of the welded portion. It is, therefore, possible with this invention to provide uniform corrugation and uniform elliptical shaping and, therefore, a superior reflection characteristic and voltage standing wave ratio. The fabrication of corrugated elliptical waveguides according to the invention may be accomplished by corrugating the hollow metal pipe or tube which has been extruded by using eccentric rotary rings or a roller to form the corrugations. Thereafter the corrugated pipe or tube is shaped by a shaping die as previously described. Inasmuch as a corrugated pipe may be stretched if high degree of tension is applied in reduction shaping, it is desirable that the effective inner circumferential length of the corrugated pipe be equal to the effective equal inner circumferential length of the corrugated elliptical waveguide so that the resultant shaped structure will have the proper dimensions. In the fabrication of corrugated elliptical waveguides, it may be desirable to utilize a plurality of dies to gradually form the corrugated waveguide into an elliptical configuration. This avoids the undesirable stretching or elongation referred to above. It is also possible to fill the valley portions of the corrugations by applying a suitable filler material, as for example, asphalt, in order to smooth the surface of the pipe prior to shaping.

A corrugated elliptical waveguide in accordance with the invention may be fabricated efficiently with the improved continuous process as described above. An aluminum pipe for instance may be extruded by an extrusion machine and then drawn through one or more shaping dies by a corrugating device which will result in a corrugated elliptical waveguide. It is also possible to fabricate a corrugated elliptical waveguide from a metal billet in a single continuous process by successively corrugating and shaping the waveguide immediately upon extrusion of the pipe.

While only certain embodiments of the invention have been illustrated and described, it is understood that alterations, changes and modifications may be made without departing from the true scope and spirit of the invention as defined by the appended claims.

What is claimed is:

1. A method for fabricating an elliptical waveguide for electrical apparatus comprising the steps continuously extruding metal tubing having a generally rounded cross-section and of a selected inner circumferential length and then continuously drawing said extruded tube through an elliptical die to form the completed waveguide having elliptical configuration, said die constituting the sole means for shaping said tube and the inner surface of said tube is maintained completely free of any contact with internal forming elements such as plugs and the like.

2. The method of fabricating an elliptical waveguide according to claim 1 wherein said extruded tubing is corrugated.

3. The method for fabricating an elliptical waveguide according to claim 1 wherein said tubing is extruded with an inner circumferential length slightly greater than the inner circumferential length of the completed waveguide and then reducing said inner circumferential length by drawing said tubing through said elliptical die.

4. The method for fabricating an elliptical waveguide according to claim 1 wherein said metal is aluminum.

5. The method for fabricating an elliptical waveguide according to claim 3 wherein said metal is aluminum.

6. The method for fabricating an elliptical waveguide according to claim 1 wherein said drawing is performed immediately following the extrusion of said tubing.

7. The method for fabricating an elliptical waveguide according to claim 1 including the step of corrugating said tubing after extrusion thereof.

8. The method for fabricating an elliptical waveguide according to claim 1 including the step of drawing said elliptical waveguide through a shaping die immediately prior to installation in said apparatus.

References Cited

UNITED STATES PATENTS

| | | | |
|---|---|---|---|
| 2,359,453 | 10/1944 | Waldron | 29—33 |
| 3,137,926 | 6/1964 | Barlow | 72—367 |
| 1,712,972 | 5/1929 | Stiefel | 72—368 |
| 1,700,751 | 2/1929 | Vincent | 72—367 |

FOREIGN PATENTS

| | | | |
|---|---|---|---|
| 166,948 | 3/1950 | Austria | 72—367 |
| 1,311,948 | 11/1962 | France | 72—367 |
| 145,525 | 6/1962 | U.S.S.R. | 72—367 |
| 623,313 | 10/1962 | Belgium | 72—283 |
| 943,044 | 4/1956 | Germany | 72—283 |

CHARLES W. LANHAM, Primary Examiner

A. L. HAVIS, Assistant Examiner

U.S. Cl. X.R.

72—274, 278, 283